United States Patent [19]

Miller

[11] Patent Number: 5,140,744

[45] Date of Patent: Aug. 25, 1992

[54] MODULAR MULTICELL BATTERY AND RACK

[76] Inventor: Robert D. Miller, 1515 Spring Hill Dr., Aston, Pa. 19014

[21] Appl. No.: 533,875

[22] Filed: Jun. 6, 1990

[51] Int. Cl.[5] .......................................... B23P 19/00
[52] U.S. Cl. ...................................... 29/730; 29/731; 429/96; 429/99; 429/100
[58] Field of Search ................... 29/730, 731; 429/96, 429/99, 100

[56] References Cited

U.S. PATENT DOCUMENTS

| | | | |
|---|---|---|---|
| 2,664,842 | 1/1954 | Lormor | 29/730 |
| 3,623,917 | 12/1969 | Chassoux | 429/99 |
| 4,065,603 | 12/1977 | Coibion | 429/99 |
| 4,275,131 | 6/1981 | Richards | 429/99 |
| 4,502,211 | 3/1985 | Hayes et al. | 29/730 |
| 4,957,829 | 9/1990 | Holl | 429/99 |
| 5,017,441 | 5/1991 | Lindner | 429/99 |

OTHER PUBLICATIONS

Exide Dynacel Type DC Brochure 1989.
Collection of Engineering Drawings for Type DC (DWG Nos. 600310/324, 600930, 900329, 900379 and 900367).
Engineering Drawing for Type DC module cover (DWG Nos. 600680 and 800160/174).

Primary Examiner—William R. Dixon, Jr.
Assistant Examiner—Willie J. Thompson
Attorney, Agent, or Firm—Frank J. Benasutti

[57] ABSTRACT

A multicell storage battery may be assembled to fit various floor space and height requirements by using standardized multicell modules having keyed connector means such that the modules can be connected only in selected orientations which facilitate the electrical connection of terminals. These standardized modules eliminate the need for standard and reverse polarity modules which existed in the prior art, and simplify battery assembly on site while allowing greater flexibility to adjust to space limitations. The keyed connectors comprise mating structures on the sides of the rectangular frame of the modules, which in combination with the modules being configured to stand vertically, create cooling ducts for the cells. An easily installed safety shield encloses the terminals of the cells and provides a front cooling duct.

37 Claims, 3 Drawing Sheets

MODULAR MULTICELL BATTERY AND RACK

TECHNICAL FIELD OF THE INVENTION

This invention relates to multicell industrial storage batteries, and particularly to multicell modules used to assemble such batteries and to the racks used to construct the modules.

BACKGROUND ART USEFUL FOR UNDERSTANDING OF THE INVENTION

Industrial storage batteries, particularly those used for standby emergency power, are often assembled on site from factory-built modules containing multiple cells. For example, if each module contains six 2-volt cells in series to produce 12 volts, a 48 volt battery can be assembled by connecting four modules in series, or a 120 volt battery by connecting ten modules in series. Capacity is usually varied by the number of plates in each cell, with a commensurate increase in the individual cell dimensions. By using such modules, the battery manufacturer can standardize factory production and still satisfy a demand for batteries of various voltage and power requirements.

Examples of such modules will be known to those in the art, such as the Exide Dynacel DC standard and reverse modules. These modules include individual battery cells mounted in an open-faced rectangular steel rack which has internal compartments configured to receive and support the cells in a horizontal row arrangement, although the modules can later be installed to lie horizontally, stand vertically, or be mounted face up in metal stands, whichever is required by the application. The open face allows installation and replacement of the cells in the rack and exposes the cell terminal posts for electrical connection. Conductor bars or cables are used to make electrical connection of the terminals between the adjacent cells in the module. On one of the end cells in the row, the positive polarity terminal or terminals are left unconnected, and on the opposite end cell the negative terminal or terminals are left unconnected. These end cell terminals are then used to make electrical connections between modules to assemble the desired voltage battery on site.

The prior art modules typically have two to six cells, depending upon the size of each cell, which is largely a function of the number of plates in the cell. Larger cells having sixteen or more plates are typically mounted in two or three cell modules, while cells having fifteen or fewer plates are typically assembled in five or six cell modules. The cells are secured in the compartments by bars running along the horizontal top and bottom edges of the open face and overlapping the edges of the cells.

Such prior art modules arrange the cells in a horizontal row in the module rack. To permit the use of shorter conductor bars to reduce resistance losses, the cells are often mounted in the rack in some sort of repeating inverted orientation. For example, in a six cell standard configuration, the positive terminal in the first cell is along one longer side (top) of the horizontal rack and the negative terminal is along the opposite longer side (bottom). The next cell in the row is inverted, such that its positive terminal is next to the negative terminal of the first cell and its negative terminal is next to the positive terminal of the first cell. The third cell in the row is then oriented the same as the first cell. This allows the use of short conductor bars to series connect the three cell sequence. To properly position the end cell terminals, the three cell sequence is repeated in the fourth through sixth cell; that is, the fourth cell and sixth cells have their positive terminal at the top, while the fifth is inverted like the second. A longer "crossbar" conductor bar is then needed to connect the negative of the third cell to the positive of the fourth. In a five cell module, the third cell compartment is left empty to eliminate the crossbar, but a longer connector is still required to bridge the empty compartment.

As the individual cell size is increased by adding additional plates for capacity, the horizontal length of the module increases according to the number of cells. For example, in the Dynacel type DC module, adding two plates per cell increases the six-cell module length approximately 5 inches, but the three cell module length by only approximately 2.5 inches. Such length variations require different length connector bars, and the addition of terminal posts in the higher capacity batteries requires connector bars spanning four or six posts, all combining to require stocking numerous lengths and variations of connector bars for factory assembly of the modules.

A further complication in the prior art modules is that the cells are electrically connected in either standard or reverse terminal configuration with the conductor bars. In standard configuration, the positive terminal(s) of the first cell is left unconnected, while the negative terminal(s) is connected to the positive terminal(s) of the second cell. The negative of the second cell is connected to the positive of the third, and so on to make an internal series connection of cells within the module, with the last cell having an unconnected negative. The unconnected end cell terminals, of opposite polarity, are used to connect modules to assemble a battery. In the reverse configuration, the negative of the first cell, rather than the positive, is the terminal left unconnected. This creates a module of reverse polarity to the standard configuration.

With such horizontal rack modules, modules of the proper polarity must be used next to each other to allow convenient electrical connection between modules. For example, to place a second horizontal module end-to-end to a first module, the modules must be of opposite configuration (i.e., standard and reverse) to avoid the need for a crossbar conductor. To stack a second horizontal module side-by-side on top of a first module, the modules also must be of opposite configuration, otherwise a cable connector must be used to curve around the like polarity terminal of the adjacent cell and reach its opposite polarity terminal. This requires preplanning the number and configuration of modules to be sent to a site for assembly, particularly where floor space or ceiling height requires particular physical dimension limits. Complex installations using many modules often require an assembly drawing of the battery to enable the proper location of the modules, and thereby sacrifice flexibility to make on-site modifications to fit floor space or height limitations.

Further, such prior art modules do not have any rack-to-rack attachment features which automatically align the individual modules in the proper polarity orientation to each other. Channels with matching bolt holes are welded along the horizontal top and bottom of the racks to allow bolted connection of modules, but a module can be improperly matched with a like polarity module, or a like module mounted upside down in an attempt to properly align the end terminals. If the physical connection is done on site by workmen who are not familiar with the electrical connections to be later made by electricians, the battery can be improperly assembled and require reassembly before electrical connection.

These shortcomings are sought to be remedied by the present invention, which also provides other advantages as discussed in the following description.

SUMMARY DISCLOSURE OF THE INVENTION

A single standardized configuration of a multicell battery module is made possible by the use of a cell rack having keyed connectors which compel the modules to be connected mechanically only in proper end-to-end and side-by-side orientations with identical modules to assemble a multicell battery. The cells are of uniform height and are arranged in the rack in a uniform orientation which allows the use of a standard short conductor bar between cell terminal posts. These racks provide factory standardization of modules, simplify the assembly of batteries on site from multiple modules while providing flexibility in the shape of such batteries to accommodate floor space and height limitations, reduce the number of different length conductor bars required, and allow the use of shorter electrical conductor bars between cells in the module and between adjacent modules. The keyed connector racks also create vertical cooling ducts along the sides of the cells, and cooperate with an easily installed safety shield to provide a front face cooling duct for the cells.

BEST MODE FOR CARRYING OUT THE INVENTION

Figure 1:
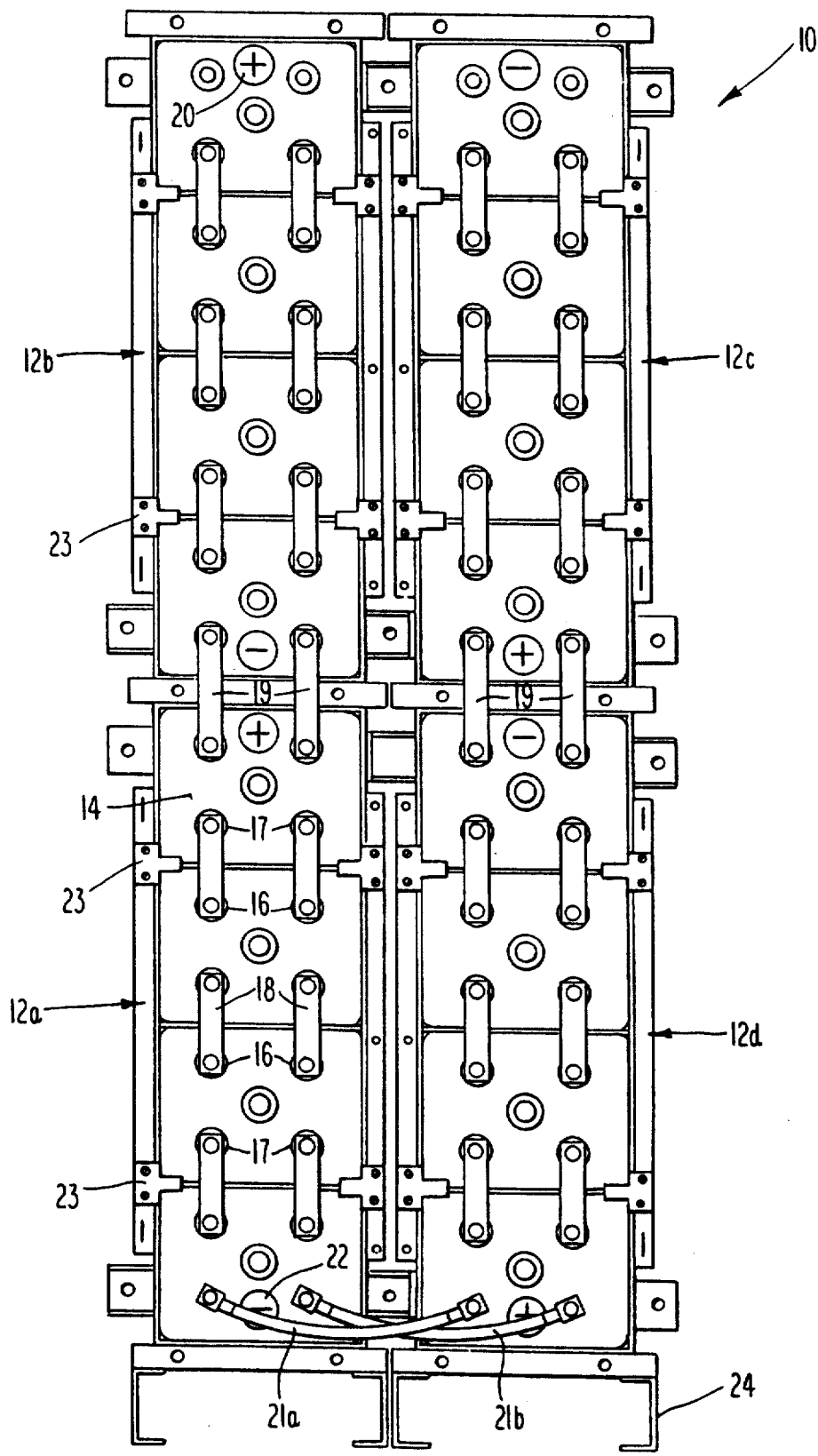
FIG. 1 is a front view of a multicell battery assembled from four multicell modules according to the invention.

A sixteen cell 32-volt stationary battery 10 is depicted in FIG. 1 as a small representative battery for convenient description of the invention. Larger batteries can be assembled by connecting additional modules. The battery 10 is assembled from four modules 12. (For clarity in discussing the battery of FIG. 1, the four modules are separately labeled as 12a,b,c and d. However, each of the modules is identical except for its orientation in the battery, and will be referred to as module 12 when it is unnecessary to distinguish positions in the battery.)

Each module 12 contains four storage battery cells 14, preferably of the sealed recombinant type to prevent electrolyte leakage and reduce gassing, arranged in a vertical column within each module. ( If a specific application battery requires a narrow voltage range which does not include a multiple of 8 volts, one or more cells can be removed from one of the modules to make up the difference.) Each of the cells 14 has four terminal posts in this embodiment; a pair of positive polarity terminals 16 and a pair of negative polarity terminals 17. As known to those in the art, cells having lower capacity may only have one set of opposite polarity terminals, while higher capacity cells may be provided with two or more sets of terminals. For example, in the commercial embodiment of this invention, cells having up to 15 plates will have single pair posts, 17 to 27 plates will have double pair posts, and cells having 29 or more plates will have triple pair posts.

The cells 14 are uniformly stacked in column in the module 12. That is, the positive terminals 16 are directly above the negative terminals 17 in each cell when the module is vertically oriented as in modules 12a and 12b of FIG. 1. (Modules 12c and 12d are identical to 12a and 12b, but are inverted for connection as explained hereafter.) This orientation places the negative terminals 17 of each of the three upper cells in modules 12a and 12b directly above and adjacent to the positive terminals 16 of the cell immediately below it in the column. Each addition of two plates in a cell increases cell width (top and bottom side lengths) by three quarters of an inch, but does not change the height. Hence, standard length short conductor bars 18 can be used to electrically connect a cell's negative terminals 17 to the corresponding positive terminals 16 of the cell above it, as depicted, and multipost connectors are no longer required even with double or triple pair posts. In addition to standardizing connector bars for stock reduction, the shorter bars reduce intercell resistance and accompanying voltage drop.

The negative terminals of one end cell and the positive terminals of the opposite end cell in module 12 remain unconnected until the module is assembled with other modules, and are then used to electrically interconnect the modules to assemble a battery of the desired voltage. Each cell has a positive polarity indicator 20 molded in the cell cover to indicate the positive terminals and a red marker encircles each positive post; likewise, each cell may have negative polarity indicator 22 molded in the cell cover if desired, and each negative post is encircled by a black marker, to indicate polarity of the module 12. Two terminal connector cables 21a and 21b connect the negative terminals 17 of the bottom cell in module 12a to the positive terminals 16 of tho bottom cell in module 12d, and short intermodule conductor bars 19 series connect module 12a to 12b, and 12c to 12d, as shown in FIG. 1, to form a battery of sixteen cells in series connection. The unconnected top terminals of modules 12b and 12c remain available for connection to an electrical load. The battery 10 is supported upon a base 24 made of steel channels connected to the modules 12.

The individual cells are secured in the cell compartments by four T-shaped corner brackets 23, located as shown in FIG. 1, which overlap the corners of the cells, replacing the full length side bars of the prior art modules. The corner brackets 23 are attached by machine screws, and are easily unscrewed for individual cell replacement. These four standard brackets replace the full length bars of the prior art modules, which varied in length depending upon module size and which had to be entirely removed to replace any cell in the module. Thus, the brackets contribute to standardization, simplification, and weight and cost reduction.

The modules 12 are factory assembled using a unique module rack (racks may alternatively be known as trays in the industry) with keyed connectors for mechanically connecting the modules on site to assemble a battery. The keyed connectors facilitate assembly by requiring the proper orientation of the modules for efficient electrical connection, as described in greater detail hereafter. Use of the keyed connector rack allows standardization of modules at the factory by eliminating the need for standard and reverse polarity configurations and inverted adjacent cells within the module, as described in the preceding background of the invention. Modules of the invention described herein differ only in width to accommodate cells having differing numbers of plates to vary capacity, and in depth to accommodate longer plates for higher ampere rating, but modules of differing capacity and ampere rating would not be combined in the normal multicell battery.

An empty module rack 30 is shown in various views in FIGS. 2, 3, 4, and 5. The rack 30 includes a generally rectangular box frame 32 made of alloy steel. The box frame 32 is oriented to stand vertically on one of its narrow sides. In FIGS. 2,3,4, and 5, the frame is shown standing on side 34 as the bottom of the frame, making the opposite narrow side 35 the top of the frame, and the long sides 36 and 37 the vertical sides. Since the narrow sides are identical except for the placement of the keyed connectors as described hereafter, the module can be inverted to stand on the side 35 instead.

The frame 30 is divided into four internal cell compartments 38 arranged along the longer, or vertical, axis of the frame. Each compartment is identically sized to create a conforming fit around a cell of the capacity and ampere rating associated with the particular module, but the height dimension of the compartment is the same in all modules to allow standard intercell conductor bars as described previously. For example, in the presently anticipated commercial embodiment, modules will be offered in four ampere ratings: 35, 55 75 and 85 amperes, having respective depth measurements of approximately 15, 20, 25 and 27.5 inches. Capacity variations ranging from 110 to 1385 ampere-hours are achieved by plate pair addition from 7 to 33 plates, with each two-plate increase creating a three quarter inch width increase in each cell. However, the height of all cells remains 26 inches in all modules to permit the standard short conductor bar 18.

Cells 14 are placed within the compartments 38 in a uniform manner with respect to their terminals, such as the negative terminal pair 17 always being at the bottom of the compartment, as shown in modules 12a and 12b of FIG. 1. This uniform orientation stacks the cells in a vertical column of four cells, and allows series electrical connections between the cells in column by short connector bars 18, as shown in FIG. 1.

To assemble a battery on site, modules can be stacked vertically or side-by-side in any combination, depending upon the floor space and ceiling height limitations. However, in order to use side-by side connection, the modules 12 must be inverted with respect to each other to allow series connection by cables 21a and 21b, as shown in FIG. 1 (modules 12a and 12d), while for vertical connection an upper module must be aligned in the same direction as the module below it to allow series connection by a short intermodule connector bar 19 (as in 12a and 12b of FIG. 1). As the number of modules is increased, and where various stacking configurations are required by the available space, it would become increasingly difficult for the assembler to determine the proper orientation for each module. To eliminate this difficulty, the rack 30 is provided with keyed connectors which permit only proper orientation.

Figure 3:
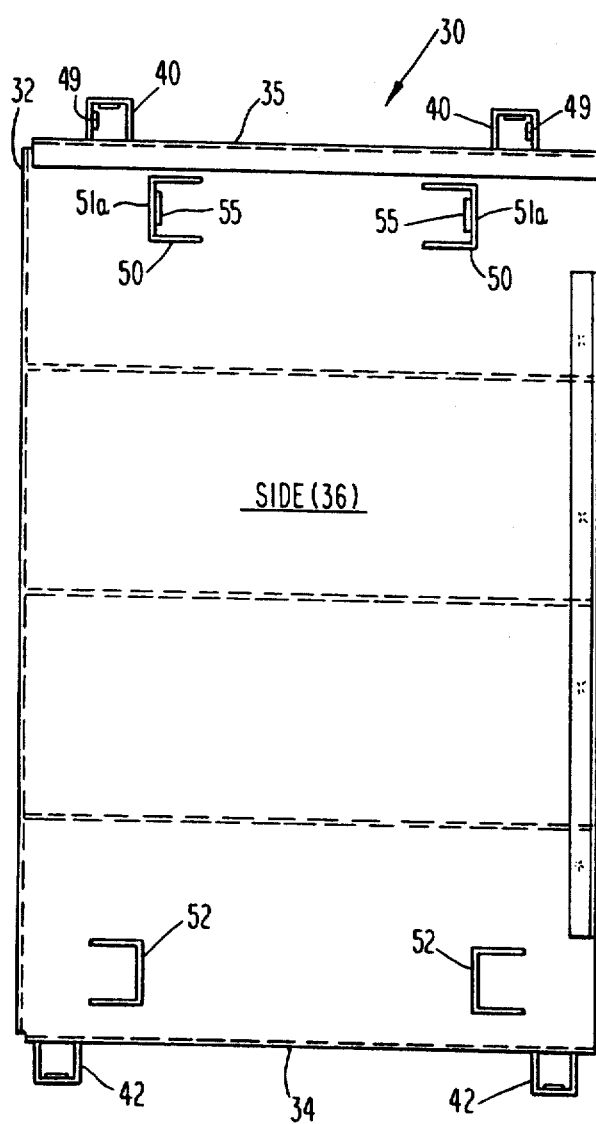
FIG. 3 is a side view of the rack of FIG. 2.

The keyed connectors for vertical stacking are a parallel pair of top channels 40 located transversely across the top side 35 of the frame and a parallel pair of bottom channels 42 located transversely across the bottom side 34 of the frame. The channels 40 and 42 are essentially identical steel channels welded to the frame 32 at their open seams, but as shown in FIG. 3, the bottom channels 42 are inset a short distance from the vertical sides 36 and 37, while the top channels 40 are inset the same distance plus the width of the bottom channels. Consequently, the modules can only be vertically stacked when they are oriented such that the inside edges of the bottom channels 42 fit against the outside edges of the top channels 40. This keyed vertical stacking always places the terminals in proper orientation for series connection. For purposes of contrast, it should be understood that the prior art modules described previously have channels along the top and bottom horizontal sides which are inset the same distance from the edges, and therefore always mate with the middle faces of the channels together regardless of the orientation.

Figure 2:
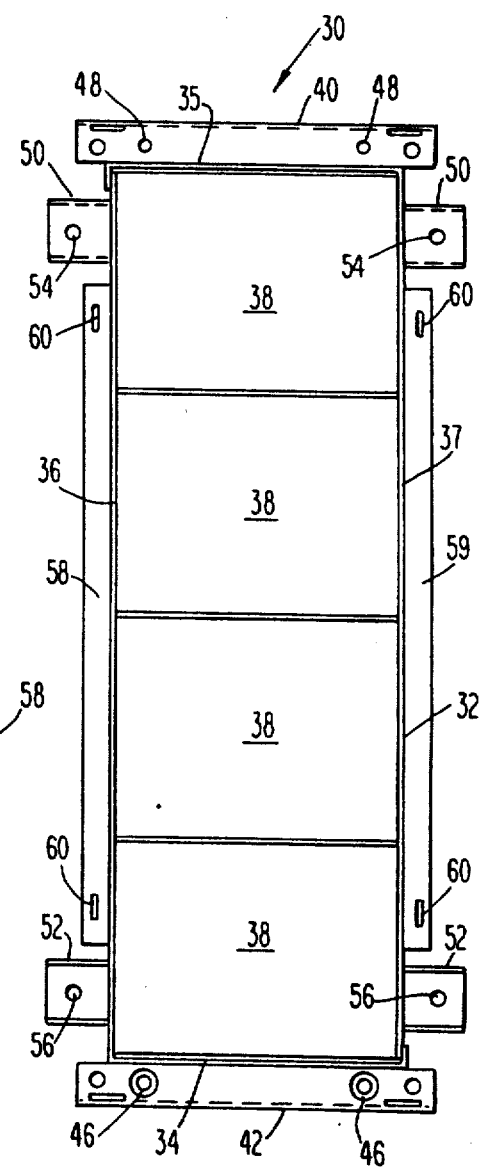
FIG. 2 is a front view of a module rack according to the invention.

The bottom channels 42 have bolt holes 46 extending through both vertical sides of the U-shape to pass the barrel of a bolt, while the top channels have a corresponding bolt hole 48 with a threaded nut 49 welded on the inside face of the channel to engage the threads of the bolt. As a minor design alternative, the bottom channels may have a larger diameter hole on the outside vertical side corresponding to the outside hole 46, as shown in FIG. 2, to allow the bolt head and a wrench socket to pass and tighten the bolt head against the inside hole 46. Both configurations allow bolting without having to grasp a nut in an inaccessible location. Both the top and bottom channels have additional spaced bolt holes on the middle side of the U-shape, to allow a bolted connection to base channels which form the base 24 of FIG. 1.

Figure 5:
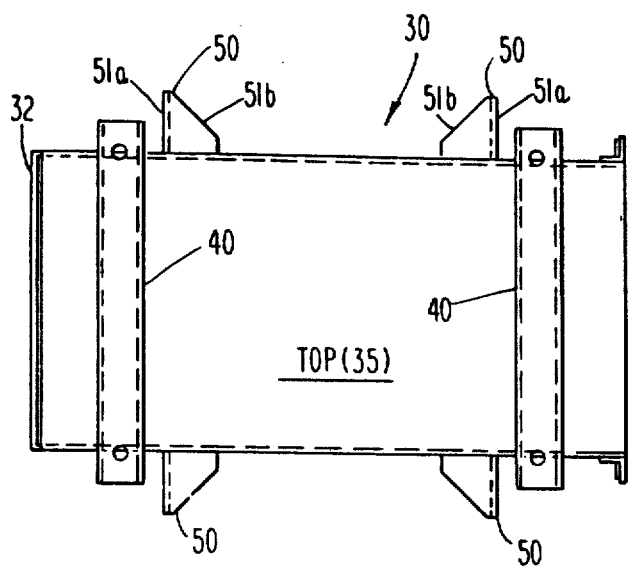
FIG. 5 is a top view of the rack of FIG. 2.

The keyed connectors for side-by-side stacking are opposing pairs of upper side flanges 50 and opposing pairs of lower side flanges 52, welded to each vertical side 36 and 37 of the frame 32. As shown in FIG. 3, the upper side flanges 50 are generally U-shaped channels along part of their length, with the bottom of the U being a flat side 51a which faces the outer edges of the frame sides. However, at the ends of the flanges, the channel sides are tapered by diagonal portions 51b, as shown in FIG. 5, to allow easy access to a bolt hole 54 with a nut 55 welded to the inner face, as shown in FIGS. 2 and 3. Similarly, lower side flanges 52 are also generally U-shaped, but with the bottom of the U being a flat side 52a which faces the center of the frame sides. The ends of the lower flanges 52 are also tapered, as shown in FIG. 4, by diagonal portions 52b to allow access to a bolt hole 56.

Figure 4:
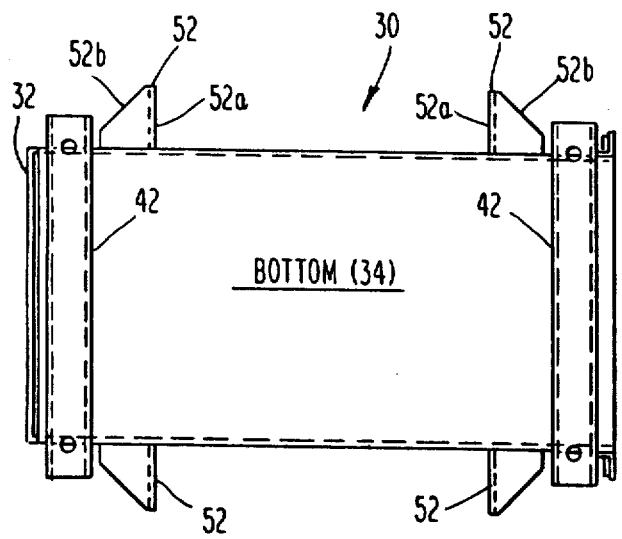
FIG. 4 is a bottom view of the rack of FIG. 2.

As seen by comparison of FIGS. 4 and 5, the upper side flanges 50 are inset from the corners of the frame 32, such that the flat sides 51a will be aligned flush against the flat sides 52a of the lower flanges 52 only when two modules are placed side-by-side with one of the modules inverted (as in modules 12a and 12d of FIG. 1). The bolt holes 54 are located such that they will then be aligned with the bolt holes 56. This keyed side alignment causes side-by-side modules to always be properly oriented for series connection.

Although the modules are primarily intended to be connected together in side-by-side or end-to-end attachment as described above, there may be some applications where it is desirable to hang the modules on stands With the open face upward. In the prior art, such stands were essentially no more than corner-post shelves. However, to take advantage of the keyed connectors, a new stand is currently being developed to have a cantilevered base supporting center posts which have matching keyed connectors to which the modules may be bolted only in the proper orientation.

Figure 6:
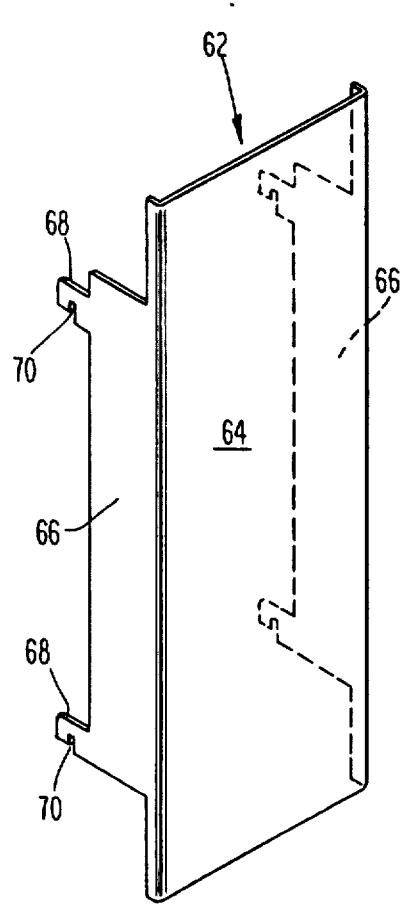
FIG. 6 is a side oblique view of a safety shield used to cover the cell terminals and conductor bars of a module.

The rack 30 also has side flanges 58 and 59, each having corner slots 60 to receive hooked arms of a front safety shield. A safety shield 62 is depicted in FIG. 6, and comprises a flat non-conductive shield plate 64 sized to cover the front face of the rectangular frame 32, leaving a small gap seam between shields of adjacent modules installed vertically or side-by-side to create an essentially closed front of an assembled battery, with gap seams of sufficient size to allow an individual shield to be lifted by the fingers for installation and removal. By way of contrast, it should be understood that the prior art modules had shields attached to the frame by threaded fasteners and washers, which were time consumming to remove and install.

A side trim panel may also be provided to cover the exposed sides of the outermost modules in an assembled battery if it is located in a visible area to enhance visual appearance. The battery front may also be framed with cabinet framing and a door for the same appearance considerations. If a door is used in lieu of the safety shields, the conductor bars and cables may be insulated by a suitable non-conducting wrap or encapsulation.

A middle portion of the longitudinal edges of the shield plate 64 are wrapped around at right angles to form sides 66, which extend sufficiently to position the plate 64 a short distance apart from the cell terminals and conductor bars to provide a cooling duct for forced or convective cooling air flow across the faces of the cells. The sides 66 terminate in hooked arms 68 aligned and sized to slip into the slots 60 of the side flanges 58 and 59 and be dropped such that the recesses 70 hook over the bottom edges of the slots 60 to hold the shield 62 in position by its weight. As a minor design addition, a security latch(not depicted) may optionally be mounted below one of the bottom hooked arms to prevent the shield from being casually or inadvertently lifted and detached.

In connection with the offset of the shield plate from the face of the cells to provide a duct for cooling air, it should further be noted that the bolt holes in the keyed side flanges 50 and 52 are positioned such that when the modules are bolted together side-by-side, a gap exists between the respective racks to provide a vertical side duct for cooling air. It can be seen from the symmetry of the modules that this side air duct will be in registry with the air duct below it when modules are stacked vertically and side-by-side, providing a continuous cooling duct along the sides of the cells on the interior of an assembled battery. The exterior sides of an assembled battery will be naturally exposed to cooling air. This arrangement provides a more equalized cooling of all cells in the battery. As previously discussed, in some applications the modules may be connected to lie on the back side with the cells facing up, but even in this orientation, the sides of the frame create vertical cooling ducts along each cell.

The structure of the rack, the attaching bolts and the base will be constructed of an electrically conductive metal, preferably steel, to which will be connected at any convenient location a grounding cable or bus, thus providing a common ground potential for the assembled battery.

INDUSTRIAL APPLICABILITY

From the preceding description, it will be apparent that this vertical multicell module with uniformly oriented cells and keyed connector means provides greater ease of assembling modular batteries to fit the available floor space and height restrictions, standardizes factory production by eliminating the need for reverse polarity configurations of modules, allows use of short standard length conductor bars, provides vertical cooling along the sides of the individual cells, and provides an easily installed and removed safety shield. Batteries assembled from such modules will be suitable for traditional stationary or stand-by power applications, such as telephone and computer systems and emergency lighting and controls, and larger batteries may be used to store energy for peak draw or low generation cycles.

This foregoing description has been provided with reference to the aspects of the invention as they are embodied in the particular structure shown in the drawings; readers are cautioned to refer to the claims which follow in order to determine the scope of the invention.

I claim:

1. A rack for the assembly of multiple cell modules adapted to be connected to form a multicell battery, said rack comprising:
   (a) a generally rectangular frame having a plurality of internal compartments to receive storage battery cells;
   (b) said frame having attached external connector means for joining the rack to at least one identical rack; and,
   (c) said connector means characterized by keyed mating structure such that the rack can be joined only in selected orientations with respect to an identical rack.

2. A rack as in claim 1, wherein the connector means includes a first set of keyed mating structure such that the rack can only be joined in a selected end-to-end orientation with respect to an identical rack, and a second set of keyed mating structure such that the rack can only be joined in a selected side-by side orientation with respect to an identical rack.

3. A rack as in claim 2, wherein:
   (a) the first set of keyed mating structure comprises a first pair of parallel channels attached to the top of the frame and a second pair of parallel channels attached to the bottom of the frame, said channels being located such that the first pair of channels will lie directly adjacent the second pair of channels of an identical rack stacked end-to-end with the frame, and
   (b) the second set of keyed mating structure comprises a first pair of brackets located on an end portion of each side of the frame, each of said first pair brackets being attached at one end thereof to the frame and extending outward from the frame, and a second pair of brackets located on the opposite end portion of each side of the frame, each of said second pair brackets being attached at one end thereof to the frame and extending outward from the frame, said first and second pair brackets being oriented and spaced on the sides of the frame such that the first pair brackets of the rack will abut for mating attachment with only the second pair brackets of an identical rack.

4. A rack as in claim 1, further characterized by the rack having means for attachment to a base such that the longer axis of the rectangular frame is oriented vertically, and wherein the cell compartments are arranged in column along the longer axis of the frame.

5. A rack as in claim 1, wherein the connector means is characterized by including a first set of keyed mating structure such that the rack can only be joined in a selected vertical orientation with respect to an identical rack, and a second set of keyed mating structure such that the rack can only be joined in a selected side-by side orientation with respect to an identical rack.

6. A rack as in claim 5, wherein the selected vertical orientation is defined by the top of one rack being connected to the bottom of the other rack, and the selected side-by-side orientation is defined by one of the racks being inverted and one of its vertical sides being connected to the corresponding opposite vertical side of the other rack.

7. A rack for the assembly of multiple cell modules adapted to be connected to form a multicell battery, said rack characterized by:
   (a) a generally rectangular frame adapted to stand with its longer axis oriented vertically, said frame having closed vertical sides, closed top and bottom, a closed back face and an open front face;
   (b) said frame having a plurality of internal compartments arranged in vertical column and adapted to have a storage battery cell installed in each compartment; and,
   (c) said frame having external connector means for joining the rack to at least one identical rack, said connector means including keyed mating structure such that the rack can be joined only in a selected vertical orientation and a selected side-by-side orientation with respect to an identical rack.

8. A rack as in claim 7, wherein the selected vertical orientation is defined by the top of one rack being connected to the bottom of the other rack, and the selected side-by-side orientation is defined by one of the racks being inverted and one of its vertical sides being connected to the corresponding opposite vertical side of the other rack with the open face of both racks facing in the same direction.

9. A rack as in claim 8, wherein the keyed mating structure comprises:
   (a) a first pair of parallel channels attached to the top of the frame and a second pair of parallel channels attached to the bottom of the frame, said channels being located such that the first pair of channels will lie directly adjacent the second pair of channels of an identical rack stacked vertically on the top of the frame, and
   (b) a pair of brackets located on an upper portion of each vertical side of the frame, each of said upper brackets being attached at one end thereof to the frame and extending outward from the frame, and a pair of brackets located on a lower portion of each vertical side of the frame, each of said lower brackets being attached at one end thereof to the frame and extending outward from the frame, said upper and lower brackets being oriented and spaced on the sides of the frame such that the upper brackets of the rack will abut for mating attachment with only the lower brackets of an identical rack.

10. A multiple cell storage battery module adapted to be connected with identical modules to form a multicell battery, said module comprising:
   (a) a generally rectangular frame having a plurality of internal compartments containing storage battery cells;
   (b) said frame having attached external connector means for joining the module to at least one identical module; and,
   (c) said connector means characterized by keyed mating structure such that the module can be joined only in selected orientations with respect to an identical module.

11. A module as in claim 10, wherein the compartments containing cells are arranged in a column along the longer axis of the rectangular frame.

12. A module as in claim 11, wherein the cells are uniformly arranged in the compartments such that opposite polarity terminal posts are directly adjacent in column to permit series connection by standard length conductors.

13. A module as in claim 10, wherein the connector means is characterized by a first set of keyed mating structure such that the module can only be joined in a selected end-to-end orientation with respect to an identical module, and a second set of keyed mating structure such that the module can only be joined in a selected side-by side orientation with respect to an identical module.

14. A module as in claim 13, further characterized by the module having means for attachment to a base such that the longer axis of the rectangular frame is oriented vertically, and wherein the compartments containing cells are arranged in a vertical column along the longer axis of the rectangular frame.

15. A module as in claim 14, wherein the cells are uniformly arranged in the compartments such that opposite polarity terminal posts are directly adjacent in column to permit series connection by standard length conductors.

16. A module as in claim 15, wherein the selected end-to-end orientation is defined by the top of one module being connected to the bottom of the other module, and the selected side-by-side orientation is defined by one of the modules being inverted and one of its vertical sides being connected to the corresponding opposite vertical side of the other module.

17. A module as in claim 16, wherein:
   (a) the first set of keyed mating structure comprises a first pair of parallel channels attached to the top of the frame and a second pair of parallel channels attached to the bottom of the frame, said channels being located such that the first pair of channels will lie directly adjacent the second pair of channels of an identical rack stacked vertically on the top of the frame, and
   (b) the second set of keyed mating structure comprises a pair of brackets located on an upper portion of each vertical side of the frame, each of said upper brackets being attached at one end thereof to the frame and extending outward from the frame, and a pair of brackets located on a lower portion of each vertical side of the frame, each of said lower brackets being attached at one end thereof to the frame and extending outward from the frame, said upper and lower brackets being oriented and spaced on the sides of the frame such that the upper brackets of the module will abut for mating attachment with only the lower brackets of an identical module.

18. A multiple cell storage battery module adapted to be connected with identical modules to form a multicell battery, said module characterized by:
(a) a generally rectangular frame adapted to stand with its longer axis oriented vertically, said frame having closed vertical sides, closed top and bottom, a closed back face and an open front face;
(b) said frame having a plurality of internal compartments containing storage battery cells, said compartments being arranged in vertical column; and,
(c) said frame having external connector means for joining the module to at least one identical module, said connector means including keyed mating structure such that the module can be joined only in a selected vertical orientation and a selected side-by-side orientation with respect to an identical module.

19. A module as in claim 18, wherein the cells are uniformly arranged in the compartments such that opposite polarity terminal posts are directly adjacent in column to permit series connection by standard length conductors.

20. A module as in claim 18, wherein the selected vertical orientation is defined by the top of one module being connected to the bottom of the other module, and the selected side-by-side orientation is defined by one of the modules being inverted and one of its vertical sides being connected to the corresponding opposite vertical side of the other module with the open face of both modules facing in the same direction.

21. A module as in claim 20, wherein the cells are uniformly arranged in the compartments such that opposite polarity terminal posts are directly adjacent in column to permit series connection by standard length conductors.

22. A module as in claim 20, wherein the keyed mating structure comprises:
(a) a first pair of parallel channels attached to the top of the frame and a second pair of parallel channels attached to the bottom of the frame, said channels being located such that the first pair of channels will lie directly adjacent the second pair of channels of an identical module stacked vertically on the top of the module, and
(b) a pair of brackets located on an upper portion of each vertical side of the frame, each of said upper brackets being attached at one end thereof to the frame and extending outward from the frame, and a pair of brackets located on a lower portion of each vertical side of the frame, each of said lower brackets being attached at one end thereof to the frame and extending outward from the frame, said upper and lower brackets being oriented and spaced on the sides of the frame such that the upper brackets of the module will abut for mating attachment with only the lower brackets of an identical module.

23. A module as in claim 22, wherein the cells are uniformly arranged in the compartments such that opposite polarity terminal posts are directly adjacent in column to permit series connection by standard length conductors.

24. A multicell storage battery assembled from multicell modules, said modules characterized by:
connector means including keyed mating structure such that each module can be joined only in selected orientations with respect to an identical module.

25. A battery as in claim 24, further characterized by the modules having a generally rectangular shape and by the cells within each module being arranged in column along the longer axis of the module.

26. A battery as in claim 25, further characterized by the cells being uniformly arranged in the modules such that opposite polarity terminal posts are directly adjacent in column to permit series connection by standard length conductors.

27. A battery as in claim 26, further characterized by the keyed mating structure cooperating to provide vertical cooling ducts along the vertical sides of the modules.

28. A battery as in claim 27, wherein the vertical cooling ducts provide essentially equalized cooling to all cells.

29. A battery as in claim 24, wherein the connector means is characterized by a first set of keyed mating structure such that each module can only be joined in a selected vertical orientation with respect to an identical module, and a second set of keyed mating structure such that each module can only be joined in a selected side-by side orientation with respect to an identical module.

30. A battery as in claim 29, further characterized by the modules having a generally rectangular shape and by the cells within each module being arranged in vertical column.

31. A battery as in claim 30, further characterized by the cells being uniformly arranged in the modules such that opposite polarity terminal posts are directly adjacent in column to permit series connection by standard length conductors.

32. A battery as in claim 31, further characterized by the keyed mating structure cooperating to provide vertical cooling ducts along the vertical sides of the modules.

33. A battery as in claim 32, wherein the vertical cooling ducts provide essentially equalized cooling to all cells.

34. A battery as in claim 31, including each module having a safety shield for shielding the terminal posts and conductor bars of the cells, said shield characterized by hook attachments to the module.

35. A battery as in claim 32, further characterized by the shields cooperating to form a vertical cooling duct for the front faces of the cells.

36. A battery as in claim 27, wherein the selected vertical orientation is defined by the top of one module being connected to the bottom of another module, and the selected side-by-side orientation is defined by a module being inverted and one of its vertical sides being connected to the corresponding opposite vertical side of another module with the open face of both modules facing in the same direction.

37. A battery as in claim 27, wherein the keyed mating structure comprises:
(a) a first pair of parallel channels attached to the top of each module and a second pair of parallel channels attached to the bottom of each module, said channels being located such that the first pair of channels will lie directly adjacent the second pair of channels of an identical module stacked vertically end-to-end on top of the module, and
(b) a pair of brackets located on an upper portion of each vertical side of each module, each of said upper brackets being attached at one end thereof to the module and extending outward from the module, and a pair of brackets located on a lower portion of each vertical side of each module, each of said lower brackets being attached at one end thereof to the module and extending outward from the module, said upper and lower brackets being oriented and spaced on the sides of the modules such that the upper brackets of a module will abut for mating attachment with only the lower brackets of an identical module.

* * * * *